Figure 1:
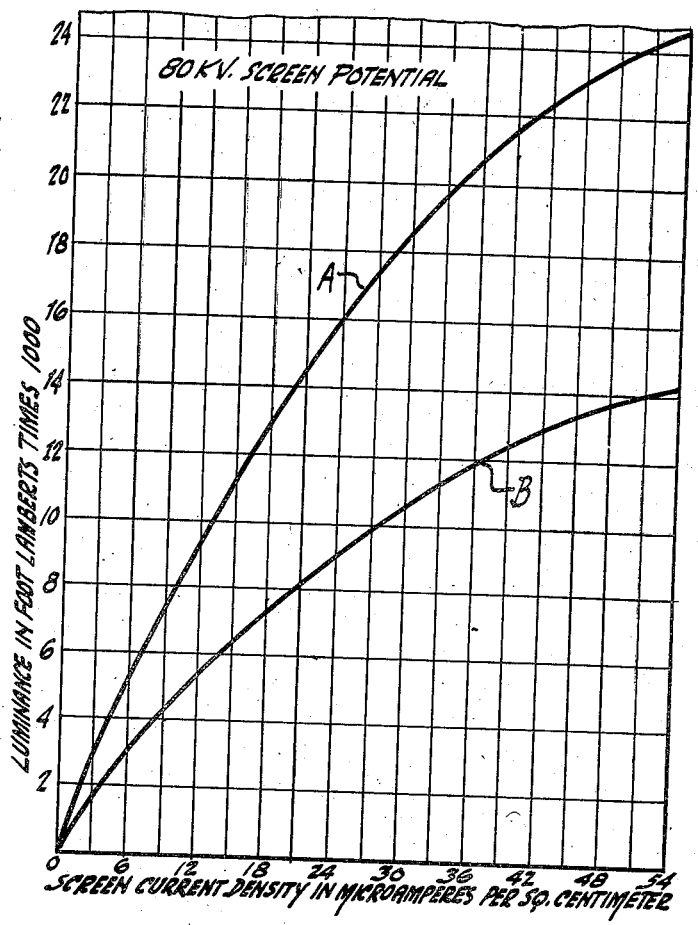

Oct. 6, 1953  C. W. THIERFELDER  2,654,675
LUMINESCENT SCREEN COMPOSITION
Filed Dec. 29, 1949

Inventor
CHARLES W. THIERFELDER
Attorney

Patented Oct. 6, 1953

2,654,675

UNITED STATES PATENT OFFICE 2,654,675

LUMINESCENT SCREEN COMPOSITION

Charles W. Thierfelder, Lancaster, Pa., assignor to Radio Corporation of America, a corporation of Delaware Application December 29, 1949, Serial No. 135,613

3 Claims. (Cl. 117—33.5)

This invention relates generally to phosphor compositions, and, more particularly, to phosphor mixtures having the property of both high emission efficiency and the production of luminescence of constant spectral characteristics when excited by cathode rays of varying intensity.

For ordinary black and white television kinescope tube screens it is desirable to use a luminescent material which will emit substantially white light when excited by cathode rays over a wide range of intensity. It is also desirable, especially in the case of projection type tubes, which are used for theater size projection television on screens many square feet in area, to use phosphors having very high emission efficiency and high peak saturation values.

The efficiency of a phosphor screen is the quantity of light output per unit of energy input. The efficiency of one phosphor usually is different from that of another phosphor. Moreover, the efficiencies of most phosphors decrease with increasingly higher values of current densities, usually falling off more rapidly as the saturation value is approached. The saturation value of a phosphor is that value of current density of excitation at which a further increase produces no appreciable increase in light output. The saturation value of one phosphor may differ widely from that of another phosphor.

It is not usually possible to prepare a satisfactory white-emitting screen using a single phosphor. Instead, two or more phosphors must be chosen, each of which emits most strongly a different color having a band of wavelengths such that when the phosphors are mixed the blend of emitted colors will produce an acceptable white.

The luminescent screen of a television kinescope tube is usually subjected to a wide range of current densities of excitation in forming the lights and shadows out of which a picture image is composed.

Because of all of these factors described above, it will be appreciated that the problem of preparing a high quality screen for emitting white light which will not shift in color with changing current densities of excitation is rather complex. The problem becomes even more difficult when the screen is to be used in apparatus requiring high intensity of light output, such as theater projection systems.

Screens for direct view kinescopes have previously generally been prepared out of a mixture of yellow-emitting zinc cadmium sulfide activated with silver and blue-emitting zinc sulfide activated with silver since each of these phosphors has about the highest efficiency of any luminescent materials having peak emission of these two colors. However, these phosphors are not generally satisfactory for projection kinescope screens because of high current saturation, particularly for zinc cadmium sulfide. Zinc beryllium orthosilicate activated with manganese is an efficient yellow-emitting phosphor with considerably less current saturation and is generally used for projection kinescopes. However, zinc sulfide approaches its saturation value at a much lower value of beam current density than does zinc beryllium orthosilicate. Consequently, at high values of beam current, the yellow emission of the silicate dominates the blue emission of the sulfide and there occurs a plainly visible shift in color emission toward the yellow.

It has previously been proposed to prepare a white-emitting screen for theater projection kinescope tubes from a mixture of yellow-emitting zinc beryllium orthosilicate and blue-emitting calcium magnesium silicate. Although the saturation values of these two phosphors are more nearly the same, the efficiency of the calcium magnesium silicate is considerably lower than that of zinc sulfide. Consequently, the use of the blue-emitting silicate is less desirable than the use of the sulfide from the standpoint of light output and efficiency.

It has now been found that a particular mixture of yellow-emitting zinc beryllium orthosilicate, blue-emitting zinc sulfide, and blue-emitting calcium magnesium silicate may be prepared for use in making white-emitting screens for kinescope projection type tubes, which exhibits little or no color shift under widely varying current densities of excitation and which has a higher output efficiency than materials previously proposed for the same use. The blue-emitting components are balanced with respect to each other and with respect to the yellow-emitting component such that a white output is obtained. It has also been found that, if these three phosphors are deposited in layers such that the high current saturation zinc sulfide material is deposited first and the two silicates are then deposited upon the layer of sulfide, a screen is obtained which shows substantially no color shift at high current densities and which is even better in this respect than a screen comprising the three phosphors settled simultaneously. Moreover, the principle of forming a luminescent screen, containing several different phosphors of different saturations, such that the phosphor having the highest current saturation is on that surface of the screen facing away from the source of excitation energy, may be applied to mixtures of phosphors other than the two silicates and the sulfide mentioned above.

One object of the present invention is to provide an improved phosphor composition for emitting white light under cathode ray excitation.

Another object of the invention is to provide an improved white-emitting phosphor composition exhibiting little or no color shift over a wide range of beam current densities.

Another object of the present invention is to provide an improved white-emitting phosphor composition having high efficiency of emission.

Another object of the invention is to provide an improved phosphor particularly adapted for use in theater projection type kinescope television tubes.

A further object of the invention is to provide an improved type of luminescent screen exhibiting improved characteristics with respect to lessened color shift at high intensities of excitation.

Another object of the invention is to provide an improved method of making a luminescent screen from a plurality of phosphors having different saturations.

Another object of the invention is to provide an improved layer type luminescent screen using phosphors having different efficiencies.

Still another object of the invention is to provide an improved luminescent screen particularly adapted for use in high intensity projection type kinescope tubes.

Figure 2:
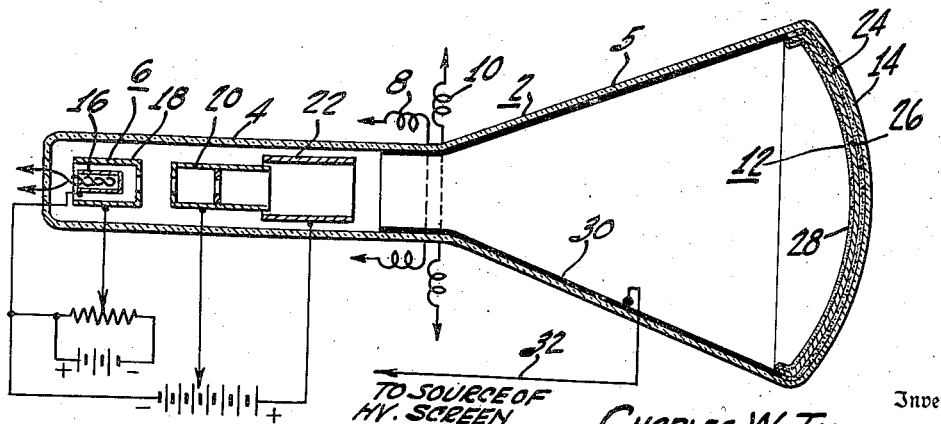

These and other objects will be more apparent and the invention will be more readily understood from the following description, including the drawings, of which:

Figure 1 is a graph showing a comparison in output luminescence vs. screen current density between an improved phosphor composition of the present invention and a different material previously used for the same purpose, and Figure 2 is a schematic view, partially in section, of a cathode ray tube including a luminescent screen made according to one embodiment of the present invention.

A phosphor composition, according to the present invention, which has proved to be highly satisfactory for preparing a white-emitting screen for theater projection kinescope tubes, comprises 23.7% by weight zinc sulfide activated with about 0.01% by weight of silver, 56.3% by weight zinc beryllium orthosilicate activated with manganese, the molar proportions based on the oxides being 7.86 ZnO:BeO:5.23 SiO$_2$:.267 MnCO$_3$, and 20% by weight calcium magnesium silicate activated with titanium dioxide, prepared according to application, Serial No. 61,638, of Arthur L. J. Smith, filed November 23, 1948, which application discloses a method of preparing a phosphor having the formula CaO:MgO:2SiO$_2$ activated with from 1 to 10 mol per cent TiO$_2$.

These proportions may be varied somewhat but it is not possible to deviate to any considerable extent without changing the emission color or without introducing the danger of color shift at high current densities of excitation. In general, it is permissible to vary each of the above percentages by about + or − 5.0% and still have an acceptable white-emitting screen.

When used as the luminescent material of the screen of a projection kinescope, it is preferable to use a particular thickness of coating. If the tube is to be operated at about 80 kilovolts screen potential, the preferred thickness of screen for particle sizes generally used is about 8 mg./sq.cm. In the figure, two curves are shown; curve A is for a screen made of the composition above described as a preferred embodiment of the present invention. Curve B is for a screen of similar weight/sq.cm. and operated at the same potential but the composition is a white-emitting mixture, with the same color temperature as curve A, of zinc beryllium orthosilicate and calcium magnesium silicate. The curves were obtained using a screen potential of 80 kv. In each curve, the luminance in foot lamberts (multiplied by a factor of 1,000) is plotted against screen current density in microamperes per square centimeter. As shown by a comparison of the two curves, a screen made of the three-component composition has higher light output at all current densities than a screen made of the two-component composition.

It is preferred to prepare a cathode ray tube screen out of the improved phosphor composition in either of two ways. One of these ways is to settle a mixture of all three phosphor components simultaneously through a cushioning layer of liquid which covers the face of the tube. First, there is poured in the tube, which is in an upright position, a cushioning layer of liquid comprising 180 cc. of a 1N solution of potassium sulfate and 460 cc. distilled water. There is then introduced into the tube a mixture of the following:

350 cc. distilled water,
150 cc. of 10% by weight potassium silicate solution,
10.2 cc. of a zinc sulfide suspension containing 41.2 mg. of the phosphor per cc.,
51.2 cc. of a zinc beryllium orthosilicate suspension containing 20 mg. of the phosphor per cc.,
35.5 cc. of a calcium magnesium silicate suspension containing 10 mg. of the phosphor per cc.

This suspension is permitted to settle for a period of at least 3 hours, the clear solution is then slowly removed by decantation and the phosphor screen is then air dried for about 5 minutes and baked for 15 minutes at about 350° C. The potassium silicate is in the form of a perfectly clear, watery solution. The adsorbed silicate serves to bind the phosphor particles into a coherent mass and to the screen when the screen is dried and baked. The potassium sulfate is an electrolyte serving to increase the speed of settling. Other electrolytes may be used which do not interfere with or react with the other ingredients.

Although the simultaneous settling of the three phosphor components produces a satisfactory screen, particular advantages are derived by a second method whereby the phosphors are settled in two separate layers. Using the same concentrations of solutions and suspensions as given in the above example, the zinc sulfide phosphor suspension is first added to the cushioning layer and settled for at least 3 hours. The quantities of potassium silicate solution and distilled water are the same as when the 3 phosphors are settled simultaneously. After the settling is complete, the supernatant liquid is poured off and the phosphor is air dried and baked as in the previous example. The settling process is then repeated, after first adding a layer of cushioning liquid to the tube, with the second and third phosphor components contained together in the same suspension. The second layer is also dried and baked as previously described. This provides a screen in which the phosphor having highest current saturation is beneath a layer of phosphor material having a lower saturation. When the screen is excited by the beam of cathode rays, the electrons first strike the phosphor having the lower saturation. As the electron beam then penetrates to the layer of higher saturation phosphor, it is diffused and loses some of its energy. This compensates partially for differences in saturation values such that color shift is substantially completely eliminated in the screen.

A cathode ray tube including a luminescent screen of the layer type, prepared as described above, is illustrated in Figure 2. Referring now to Figure 2, the tube 2 may be of conventional form, having a neck portion 4 and a flared portion 5. In the neck portion 4 is incorporated an electron gun 6 for the generation of an electron beam controlled by beam deflection means, including horizontal deflection coils 8 and vertical deflection coils 10 which, when energized with proper current variations, sweep the electron beam over the luminescent screen 12 attached to the inner surface of the face 14 of the tube opposite the neck portion. The electron gun includes an electron source or cathode 16, an electron beam intensity control electrode 18 and conventional first and second anodes 20 and 22 connected to a conventional potential source at points which are positive with respect to the cathode 16. The electrons emitted by the cathode are controlled in quantity or intensity and directed to the phosphor screen 12 to produce a beam of electrons incident upon the screen. The luminescent screen comprises two phosphor layers and a film of metal. The first phosphor layer 24, which is next to the surface of the tube face 14, is composed of the activated zinc sulfide phosphor. The second phosphor layer 26 is superimposed on the first layer and is composed of the mixture of zinc beryllium orthosilicate and calcium magnesium silicate previously described. The electron beam, thus, first strikes the top layer 26 of phosphors having relatively low current saturation, loses some of its energy in penetrating this layer, and then strikes the lower layer of phosphor 24. Superimposed on the top phosphor layer 26 may be a film of aluminum 28. This increases the intensity of light output from the screen face and also provides a conductive means for applying high voltage screen potential. The layer of aluminum metal is not essential if the tube is for use in an ordinary home receiver television set but for theater type projection maximum light output is desired.

The inner walls of the tube, including the flared portion 5 and that part of the neck portion 4 beyond the end of the second anode 22 may also be provided with a conductive coating 30 of colloidal graphite. This coating extends to and is in contact with the metal film 28 covering the phosphors. A wire lead 32 may be sealed through the wall of the flared portion 5 of the tube near the screen, the wire being in electrical contact with the conductive coating 30. This lead may be utilized for making a connection with a suitable source of high voltage screen potential.

In a preferred form of screen used in high intensity projection kinescope tubes, the lower layer of zinc sulfide contains 1.9 mg./sq. cm. of the phosphor while the upper layer contains 1.6 mg./sq. cm. of the calcium magnesium silicate and 4.5 mg./sq. cm. of the zinc beryllium orthosilicate. Stated in another way, the upper layer contains about 26.2% by weight of calcium magnesium silicate and about 73.8% by weight of zinc beryllium orthosilicate. The tube in which this screen is used is intended to be operated at about 80 kv. screen potential.

The above described principle of forming a cathode ray tube screen has general application to any situation in which the phosphor composition includes two or more components having substantially different wavelengths of peak emission which are to be combined to give a desired emission color characteristic and where the individual phosphors have different excitation current saturation values. The phosphor with highest saturation should always be beneath a phosphor having less saturation. This may be applied also where three or more phosphors are used, each having different saturations. Then the three components may each be settled separately.

I claim as my invention:

1. A luminescent viewing screen comprising a light-transmitting base material and a plurality of layers of different phosphor materials, the lower one of said layers adjacent said base comprising silver activated zinc sulfide and an upper layer superimposed on said lower layer comprising a mixture of manganese activated zinc beryllium orthosilicate and titanium activated calcium magnesium silicate.

2. A screen according to claim 1 in which said upper layer comprises about 73.8% by weight of said zinc beryllium orthosilicate and about 26.2% by weight of said calcium magnesium silicate.

3. A luminescent viewing screen comprising a base support, a plurality of layers of different phosphor materials on said base support, one of said phosphor layers adjacent said base comprising about 18.7% to about 28.7% zinc sulfide activated with silver, and one of said phosphor layers superimposed on said adjacent layer comprising a mixture of about 51.3% to about 61.3% zinc beryllium orthosilicate, activated with manganese, and about 15% to about 25% calcium magnesium silicate activated with titanium.

CHARLES W. THIERFELDER.

References Cited in the file of this patent

UNITED STATES PATENTS

| Number | Name | Date |
|---|---|---|
| 2,412,654 | Sadowsky | Dec. 17, 1946 |
| 2,415,129 | Froelich | Feb. 4, 1947 |
| 2,443,728 | Froelich | June 22, 1948 |
| 2,446,248 | Shrader | Aug. 3, 1948 |
| 2,452,523 | Leverenz | Oct. 26, 1948 |
| 2,475,330 | Levy | July 5, 1949 |
| 2,478,387 | Graham et al. | Aug. 9, 1949 |

OTHER REFERENCES

Solid Luminescent Material, John Wiley & Sons N. Y., 1948 edition (received in the Patent Office July 6, 1948), pages 164–166 and page 202.